OP 4,493,990

United States Patent [19]
Koszytorz et al.

[11] Patent Number: 4,493,990
[45] Date of Patent: Jan. 15, 1985

[54] APPARATUS FOR AUTOMATICALLY ADJUSTING A DEFLECTION UNIT

[75] Inventors: Gunther Koszytorz, Penzberg; Herbert Lucke, Erlangen; Gerhard Schlosser, Weiher; Joachim Vath, Erlangen, all of Fed. Rep. of Germany

[73] Assignee: Siemens Aktiengesellschaft, Munich, Fed. Rep. of Germany

[21] Appl. No.: 425,909

[22] Filed: Sep. 28, 1982

[30] Foreign Application Priority Data

Oct. 23, 1981 [DE] Fed. Rep. of Germany ....... 3142152

[51] Int. Cl.³ .............................................. G01J 1/20
[52] U.S. Cl. .................... 250/201; 250/236; 350/6.5
[58] Field of Search ............... 250/201 R, 234, 235, 250/236, 230; 350/6.5, 6.6; 358/293

[56] References Cited

U.S. PATENT DOCUMENTS 4,264,809  4/1981  Fearnside .................... 250/201
4,417,330  11/1983  Hazel et al. ................ 250/201

OTHER PUBLICATIONS

Patent Abstracts of Japan, Jun. 9, 1981, vol. 5, No. 88, 56-35222.

Primary Examiner—David C. Nelms
Assistant Examiner—J. Gatto
Attorney, Agent, or Firm—Kenyon & Kenyon

[57] ABSTRACT

An apparatus for automatically adjusting the characteristic of a deflection unit, illustratively of the type used in laser recording equipment. A reference value for the deflection unit is conducted to a first input of a multiplier, the second input of which is connected to the output of a first memory. The output of the multiplier is connected to a first input of an adder, the second input of which is connected to the output of a second memory. In addition, a comparator is provided which compares the position of the deflection unit with two adjustment reference values. The content of the second memory is varied in response to a zero-adjustment command until, for a predetermined reference value zero, the deflection unit has assumed a zero position. Upon the issuance of a slope-adjustment command, the content of the first memory is varied until, for a second adjustment reference value, the deflection unit has assumed its desired position. The contents of the memories are preserved so that a reference value which is predetermined in normal operation is corrected so that the characteristic of the deflection unit agrees with a desired characteristic.

9 Claims, 5 Drawing Figures

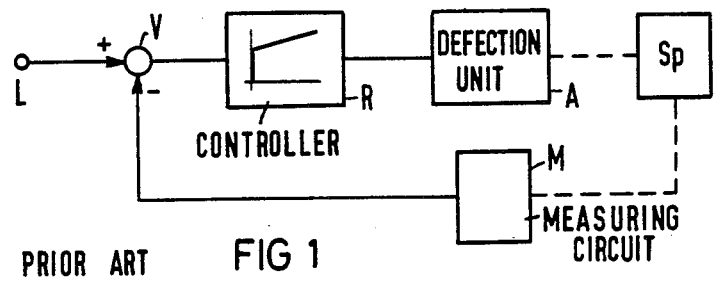
PRIOR ART FIG 1
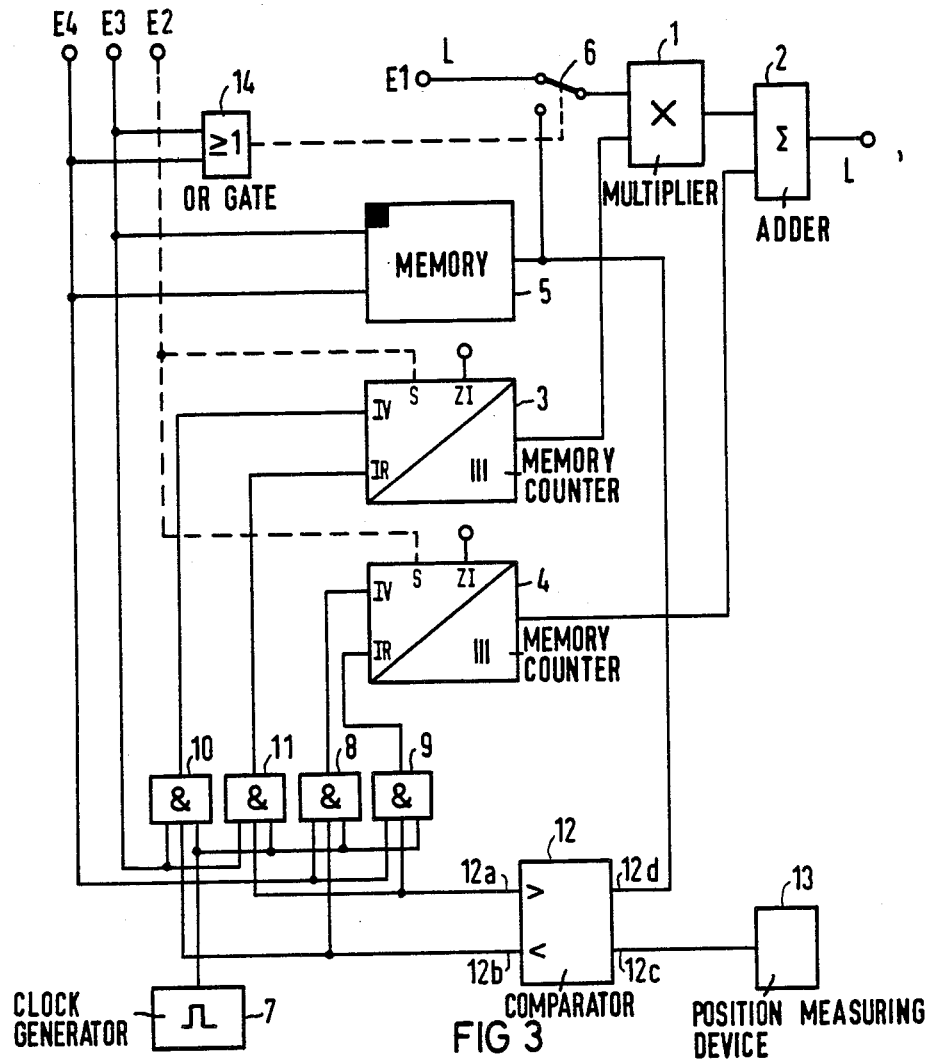
FIG 3

APPARATUS FOR AUTOMATICALLY ADJUSTING A DEFLECTION UNIT

BACKGROUND OF THE INVENTION

This invention relates generally to arrangements for controlling and adjusting deflection units, and more particularly, to a system which automatically adjusts the characteristics of the deflection unit with respect to its coordinate origin and the slope of the deflection function.

The use of deflection units is required, for example, to adjust deflection mirrors for the laser beams in laser recording equipments. In such systems, a position signal is sensed by an actual-value measuring circuit and compared against a reference value. A controller which controls the deflection unit brings the position signal into agreement with the reference value. It is a problem with such systems, however, that the actual-value measuring circuits which are commonly used are of a type which operates with a capacitive sensor which is subject to thermal drift which produces a deviation between the preset reference value and the actual position of the deflection mirror. Such a deviation produces displacements and scale changes in the recording field. The temperature drift produces not only a shift in the origin of the characteristic, but also a change in its slope.

Prior art systems embodied in commercially available equipments compensate for the temperature drift by preheating the deflection units and requiring the performance of a manual compensation procedure. This is generally achieved in the controller by the manipulation of potentiometers which adjust the characteristic. It is a problem, however, that complete compensation is not possible by preheating the deflection unit. With the manual compensation procedure, a correction of the error produced by the thermal drift is generally possible only for a given operating temperature.

An arrangement for controlling the upper and lower limits of a position control system is described in "Patent Abstracts of Japan," June 9, 1981, vol. 5, no. 88, 56-35222. In this known arrangement, a position measuring signal produced by a position pickup is conducted via a differential amplifier and a multiplier. The position measuring signals for the upper and lower limits are stored in a memory. The memory for the lower limit controls the zero point of the differential amplifier by means of an arithmetic unit. A multiplication factor for the multiplier is set via a further arithmetic unit in response to the difference between the two limits. In this manner, fast control is achieved independently of the changes in the upper and lower limits. Although this known arrangement achieves an adaptation to the limits of a control system, the automatic adjustment of a characteristic which is desired for a deflection unit is not achieved.

It is, therefore, an object of the invention to provide an arrangement for adjusting the linear characteristic of deflection unit so that automatic adjustment is achieved.

SUMMARY OF THE INVENTION

The foregoing and other objects are achieved by this invention which provides an arrangement for automatically adjusting the characteristic of a deflection unit with respect to origin and slope, the arrangement having a multiplier having a first input for receiving a reference value for the deflection unit, and a second input which is connected to the output of a first memory. The multiplier is coupled at its output to a first input of an adder; the adder being connected at its second input to the output of a second memory. A position measuring device which produces a position measuring signal for the deflection unit is connected to a first input of a comparator. The comparator receives at a second input thereof a zero value as a first adjustment reference value if a "zero-adjustment command" has been issued. A second adjustment reference value is present at the second input of the comparator if a "slope-adjustment command" has been issued. The comparator is provided with a first output for producing a signal if the position measuring signal at the first input thereof is larger than the value at the second input. A signal is produced at a second output of the comparator if the position measuring signal at the first input is smaller than the valve at the second input. If a "zero-adjustment command" has been issued, the first adjustment reference value "zero" is provided as the reference value for the deflection unit. The content of the second memory is incremented if a signal is present at the first output of the comparator. Alternatively, the second memory is decremented if a signal is present at the second output of the comparator. Such incrementing or decrementing is continued unitl none of the outputs of the comparator bears a signal. If a "slope-adjustment command" has been issued, the second adjustment reference value is provided as the reference value for the deflection unit, and the content of the first memory is incremented if a signal is present at the first output of the comparator. If a signal is present at the second output of the comparator, the content of the first memory is decremented. The incrementing or decrementing processes are continued until none of the outputs of the comparator bears a signal.

In accordance with the invention, therefore, the automatic adjustment of the zero point, as well as the slope of the characteristic of the deflection unit, is achieved. Such a compensating adjustment is achieved in a relatively short time, thereby permitting it to be performed periodically. Thus, such automatic adjustment is possible in any operating condition.

In one advantageous embodiment of the invention, the first and second memories are loaded, prior to the adjustment, with values which are smaller than the values expected after the adjustment is completed. Thus, only incrementation of the contents of the first and second memories takes place. Since, under this mode of operation, the contents of the memories are changed in only one direction, the comparator need only determine whether the position measuring signal is still smaller than the predetermined value.

In a further advantageous embodiment, the desired adjustment values are stored in a third memory which receives at its address inputs the zero-adjusting command and the slope-adjusting command. The outputs of the third memory are connected to the first input of the multiplier and to the second input of the comparator. In this manner, fixed adjusting values can be preprogrammed.

In a further advantageous embodiment of the invention, a double-throw switch is electrically interposed between the third memory and the first input of the multiplier. The doube-throw switch receives at a first input thereof a signal corresponding to the desired value of the deflection unit. The second input of the double-throw switch is connected to the output of the third memory, and switches, in the event of a "slope-adjusting command," or a "zero-adjusting command," from the first to the second input. With this switch, the reference value which is entered into the deflection unit is automatically converted to the adjustment reference value during the adjustment process.

The first and second memories may be easily embodied as first and second counters, respectively. A clock generator is provided which operates on the increment and decrement inputs of the first and second counter/memories by producing counting pulses. In one embodiment, the clock generator is connected to the respective first inputs of four AND gates. The "zero-adjustment command" is present at the respective second inputs of the first and second AND gates, and the "slope-adjustment command" is present at the respective input of the third and fourth AND gates. The first output of the comparator is connected to the respective third input of the second and fourth AND gates, and the second output of the comparator is connected to the respective third inputs of the first and third AND gates. The output of the first AND gate is connected to the increment input of the second memory/counter, the output of the second AND gate is connected to the decrement input of the second memory/counter, the output of the third AND gate is connected to the increment input of the first memory/counter, and the output of the fourth AND gate is connected to the decrement input of the first memory/counter. In this circuit arrangement, a drive of the counters with increment and decrement pulses is required to perform the adjustment process.

In an alternative embodiment, the first, second, and third memories may also be buffer memories which are appropriately loaded from the data bus of a microprocessor or a computer. Thus, the adjustment arrangement can be addressed in conjunction with a microprocessor or computer in a particularly simple manner.

In a still further embodiment, the position measuring device may contain a plate which is connected to the shaft of the deflection unit. The plate is arranged in the light path between a light transmitter and a light receiver which delivers the position measuring signal. The plate is provided with a first slit aperture which is in the light path at the zero position of the deflection unit. A second slit aperture in the plate lies in the light path if the position of the deflection unit agrees with the second reference value. With such a position measuring device, the adjustment points can be picked-up accurately in a simple manner. This position measuring arrangement has the further advantage that its output signal is the same at both adjustment points, so that the comparator can work at both adjustment points with the same comparison value, and thereby, switching-over is not necessary.

The light receiver may advantageously be configured as a differential photodiode. The output signal of this differential photodiode is zero at both adjustment points, so that only a comparison with the "zero" signal is necessary for adjustment. The comparator is thereby simplified to a limit indicator.

BRIEF DESCRIPTION OF THE DRAWINGS

Comprehension of the invention is facilitated by reading the following detailed description in conjunction with the annexed drawings, in which:

FIG. 1 is a block and line representation of a known control arrangement for a deflection unit which is in common use in laser recording equipment;

FIG. 3 is a block and line representation of an automatic circuit arrangement constructed in accordance with the principles of the invention for adjusting the characteristic of a deflection unit;

DETAILED DESCRIPTION

FIG. 1 is a block and line representation of a prior art control arrangement for a deflection unit A of the type which is commonly used, for example, in laser recording equipments. In this known system, deflection unit A moves a mirror Sp, the actual position of which is measured with an actual-value measuring circuit M. Measuring circuit M may be of the type which contains a capacitive position pickup. The measured value of the actual position is compared against a position reference value $L_{soll}$ in a comparator V. The control difference is conducted to a controller R which drives deflection unit A.

Figure 2:
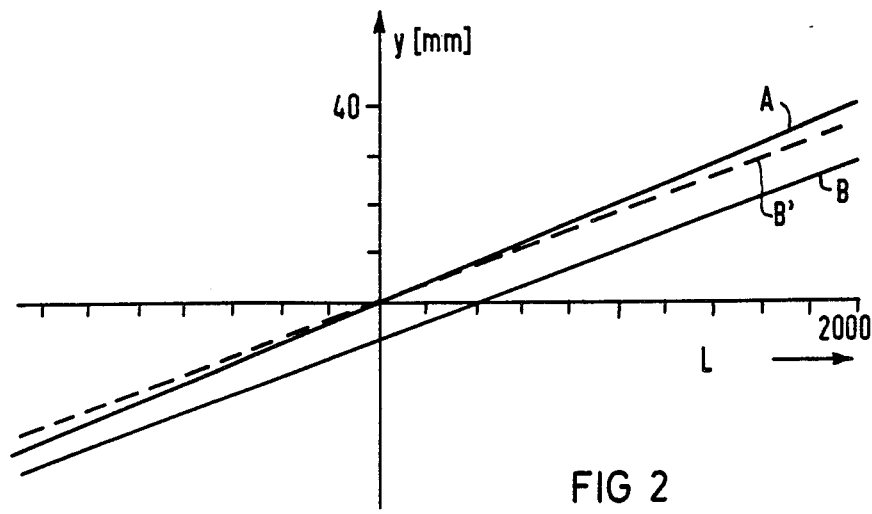
FIG. 2 is a graph showing the effects of thermal drift on the actual-value measuring circuit.

FIG. 2 is a graph of various deflection unit characteristics in accordance with which the deflection unit may operate. For example, characteristic A shown in FIG. 2 is the ideal operating characteristic for the deflection unit. In accordance with characteristic A, a writing beam deflection, along the small y axis, of 0.02 mm corresponds to one step of the reference value, $L_{soll}$, along the x axis. With ±2,000 steps of the reference value, a beam deflection totaling ±40 mm is obtained.

As noted hereinabove, the actual-value measuring circuit M is subject to thermal drift so that the measured value for the actual position does not agree with the actual position of the deflection mirror. This results in a parallel shift, as well as in a change of the slope of characteristic A, so as to cause the deflection unit to operate in accordance with characteristic B which is also shown in FIG. 2. In accordance with characteristic B, a reference value signal of +2,000 or −2,000, respectively, results in a beam deflection of approximately +32 or −42 mm, respectively. In order to compensate for the deviation of the characteristic from the ideal characteristic A to characteristic B, the position reference value $L_{soll}$ must be changed correspondingly. In this manner, the characteristic of the deflection unit can be matched to its desired characteristic. Such an adjustment is possible if characteristic B is first shifted so that it runs through the origin of the coordinate system, such as characteristic B', shown in dashed line. Such a shift in characteristic B can be achieved by adding a predetermined amount to reference value $L_{soll}$. Subsequently, characteristic B' must also be rotated, and this can be achieved by multiplication by a constant factor. The described adjustment is advantageously performed at two adjustment points, the first adjustment point being at zero for shifting the characteristic in a parallel manner, and a second adjustment point which is different from zero, for rotating the characteristic.

FIG. 3 shows a block and schematic representation of a circuit arrangement constructed in accordance with the invention for performing automatically the adjustments to the characteristic of the deflection unit. The position reference value $L_{soll}$ which is present at input E1 is conducted via a double-throw switch 6 to the first input of a multiplier 1. The second input of multiplier 1 is connected to the output of a memory 3. The multiplication process which is effected by this arrangement produces the described rotation of the characteristic. The output of multiplier 1 is connected to a first input of an adder 2, the second input of which is connected to a second memory 4. With adder 2, the described parallel shift of the characteristic is achieved, so that the corrected reference value $L_{soll}'$ is present at the output of the adder.

In the circuitry described hereinbelow, the memories 3 and 4 are loaded with the values required to perform the adjustment. As described, a dual-adjusting operation is required to perform the zero and slope adjustments. At one input E4, the zero adjustment command is provided, the command being conducted to an address input of a third memory 5, to the respective second inputs of two AND gates 8 and 9, and to an input of an OR gate 14. OR gate 14 produces at its output a signal which addresses the double-throw switch 6 and thereby switches the first input of multiplier 1 from input E1 to the output of memory 5. In memory 5, the corresponding adjustment reference value was selected by the "zero-adjustment command," which in this case has the value zero. Memory 4 must then be set so that the writing beam actually occupies the zero position. For this purpose, a separate position measuring device 13 is provided which must have no temperature error. Since this position measuring device 13 must scan the position of the light beam at only two points, illustratively the zero point and at another adjustment point, this process is easily realized, as will be described hereinbelow.

The output signal of position measuring device 13 is conducted to comparator 12, the reference input of which is connected to the output of memory 5. Since, in the event of a "zero-adjustment command," a zero signal is present at the output of memory 5, the position measurement signal of position measuring device 13 is thus compared against zero. Comparator 12 is provided with two inputs, 12a and 12b. A "1" signal is present at output 12a if the position measuring signal is larger than the reference value, and a "1" signal is present at output 12b if the position measuring signal is smaller than the reference signal. Output 12a of comparator 12 is connected to the third input of AND gate 9 and the output 12b is connected to the third input of the AND gate 8. The output of a clock generator 7 is connected to the respective first inputs of the two AND gates 8 and 9. The output of AND gate 8 is connected to the increment input IV of memory/counter 4, and the output of AND gate 9 is connected to decrement input IR of counter 4.

The clock pulses of clock generator 7 are connected to the increment input of memory/counter 4 during a "zero-adjustment command," if the position measuring signal is smaller than zero, and to the decrement input if the position measuring signal is larger than zero. In this manner, the memory/counter is brought to a value such that if a reference value of zero is provided, the writing beam actually occupies the zero position. As explained, this is accomplished by adding the counter reading of memory/counter 4 to the desired (reference) value in adder 2. Thus, a parallel shift of the characteristic to be adjusted is achieved. This completes the zero adjustment.

Subsequently, a rotation of the characteristic to be adjusted is performed with the following "slope-adjustment command" which is present at input E3. Input E3 is connected to one input of OR gate 14, to a further address input of memory 5, and to the resepective second inputs of AND gates 10 and 11. In memory 5, an adjustment reference value which is different from zero is addressed by the "slope-adjustment command." Since, as a result of the "slope-adjustment command," double-throw switch is likewise switched via OR gate 14 to the output of memory 5, this adjustment reference value is entered into the deflection unit instead of reference value $L_{soll}$. The adjustment reference value is further conducted to the comparison input of comparator 12. It is assumed here that position measuring device 13 supplies the second adjustment reference value as the output variable if the writing beam is adjusted to the second adjustment point. Position measuring device 13, however, can also supply the output value "zero" at the second adjustment point, as shown, for example, in the illustrative embodiment which will be described below. In this case, the value is, of course, entered as the reference value. The position measuring device, however, can also supply any desired position measuring signal at the second adjustment point if the former is stored in the memory and is optionally conducted to the reference input of comparator 12.

The comparator then checks, at the second adjustment point, whether the delivered position measuring signal is larger or smaller than the comparison value. As noted above, output 12b of comparator 12 is connected to the third input of an AND gate 10, and output 12a is connected to the third input of an AND gate 11. The output of AND gate 10 is connected to the increment input IV of memory/counter 3, and the output of AND gate 11 is connected to the decrement input IR of memory/counter 3. In addition, the output of clock generator 7 is connected to the first inputs of AND gates 8 and 9.

If a "slope-adjustment command" is present, counter 3 is therefore advanced by the clock pulses from clock generator 7 until the position of the writing beam agrees with the given second adjustment reference value. This is achieved, as explained, by feeding the output signal of counter 3 to the second input of multiplier 1. Such a multiplication achieves a rotation of the characteristic B' until it conforms to characteristic A. This completes the slope adjustment.

After completing the slope adjustment, double-throw switch 6 is switched back again, so that the position reference value $L_{soll}$ is again entered into the deflection unit. The readings in memory/counters 3 and 4 are preserved until the next adjustment process, so that there is agreement between the characteristic of the deflection unit and its desired characteristic, at least for a certain operating range. The adjustment process can take place, for example, at fixed intervals, illustratively after a given number of lettering operations, or upon request. During this process, the period of the clock pulses is selected so that a possible transient of the deflection unit always has decayed between subsequent clock pulses.

In the foregoing illustrative embodiment, comparator 12 must be monitored with respect to whether the position measuring signal is larger or smaller than the adjustment reference value. Along with such monitoring, two output signals of comparator 12 must be processed. Alternatively, however, counters 3 and 4 can also be set to values which are below the values expected after the adjustment is made. This can be done, for example, by a setting signal at input E2, which is connected to the respective setting inputs S of counters 3 and 4 by the dashed lines shown in FIG. 3. The predetermined values to which memory/counters 3 and 4 are to be set are present at their respective presetting inputs Z1. In this case, only the smaller signal or output 12b of comparator 12 is evaluated. The readings of memory/counters 3 and 4 are incremented until the signal at output 12b has disappeared. Since the decrementing of counters 3 and 4 is eliminated, AND gates 9 and 11 can also be omitted.

This method wherein the adjustment values are approached from only one side takes somewhat longer than the previously described approach from two sides, because with the presetting of memory/counters 3 and 4, their values are, on the average, further removed from the final value to be adjusted. Instead, only one comparison signal needs to be evaluated and the accuracy when approaching the adjustment point is somewhat higher. Furthermore, the danger that the deflection mirror Sp might oscillate is less than if it is moved only in one direction.

Figure 4:
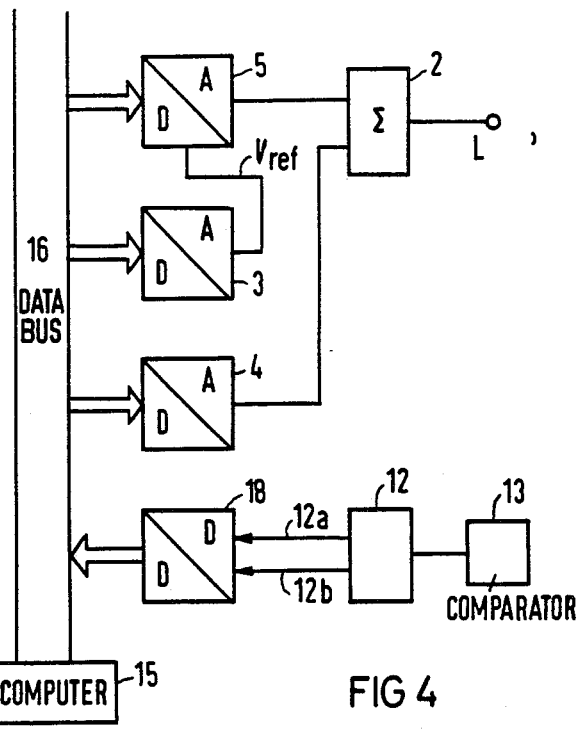
FIG. 4 is a block and line representation of a computerized embodiment of the invention.

FIG. 4 shows a block and line representation of an illustrative computerized arrangement for performing the automatic adjustment. In this embodiment, memories 3, 4, and 5 are realized as buffer memories which are loaded by a microprocessor or computer 15 via a data bus 16. Buffer memories 3–5 each contain a digital-to-analog converter which converts the digital signals of the microprocessor into analog values for further processing. The digital-to-analog converter of buffer memory 5 is designed as a multiplying converter, the multiplying input of which is connected to the output of buffer memory 3. Outputs 12a and 12b of comparator 12 are similarly coupled via a buffer memory 18 to data bus 16. In the embodiment of FIG. 4, it is assumed that the position measurement signal of position measuring device 13 goes to zero for every adjustment reference value. Comparator 12, therefore, compares the position measurement signal always against zero, so that setting a separate comparison voltage is not necessary. Comparator 12 may be designed here as a window discriminator which delivers a signal at outputs 12a and 12b, respectively, only if the input signal lies outside a bandwidth about the zero point.

In normal operation, computer 15 sets buffer memory 5 to the position reference value for the deflection unit, so that the deflection unit is adjusted accordingly. During the adjusting process, the computer sets the input signal of buffer memory 5 to zero during the zero adjustment. If the described method of unilateral approach to the adjusted state is performed, microprocessor 15 feeds to buffer memories 3 and 4 values which lie below the expected values in the adjusted state. Output 12b of comparator 12 interrogates, via buffer memory 18, whether the smaller signal is present. If such is the case, the content of buffer memory 4 is increased by one. Then output 12b of comparator 12 is interrogated again as to whether the smaller signal is still present. The content of buffer memory 4 is increased until the smaller signal at output 12b of comparator 12 has disappeared. Between the interrogation processes, a transient time of deflection mirror Sp is optionally being waited for. In this manner, the zero adjustment is completed.

After completing the adjustment, a second adjustment value which is different from zero, and lies as far as possible in the vicinity of the end deflection of mirror Sp, or agrees with the latter, is set into buffer memory 5. The content of the buffer memory remains unchanged. The smaller signal at output 12b of comparator 12 is again interrogated and the content of buffer memory 3 is incremented until the smaller signal has disappeared. This completes the adjustment and computer 15 can again set the position reference value for deflection unit A in normal operation.

Figure 5:
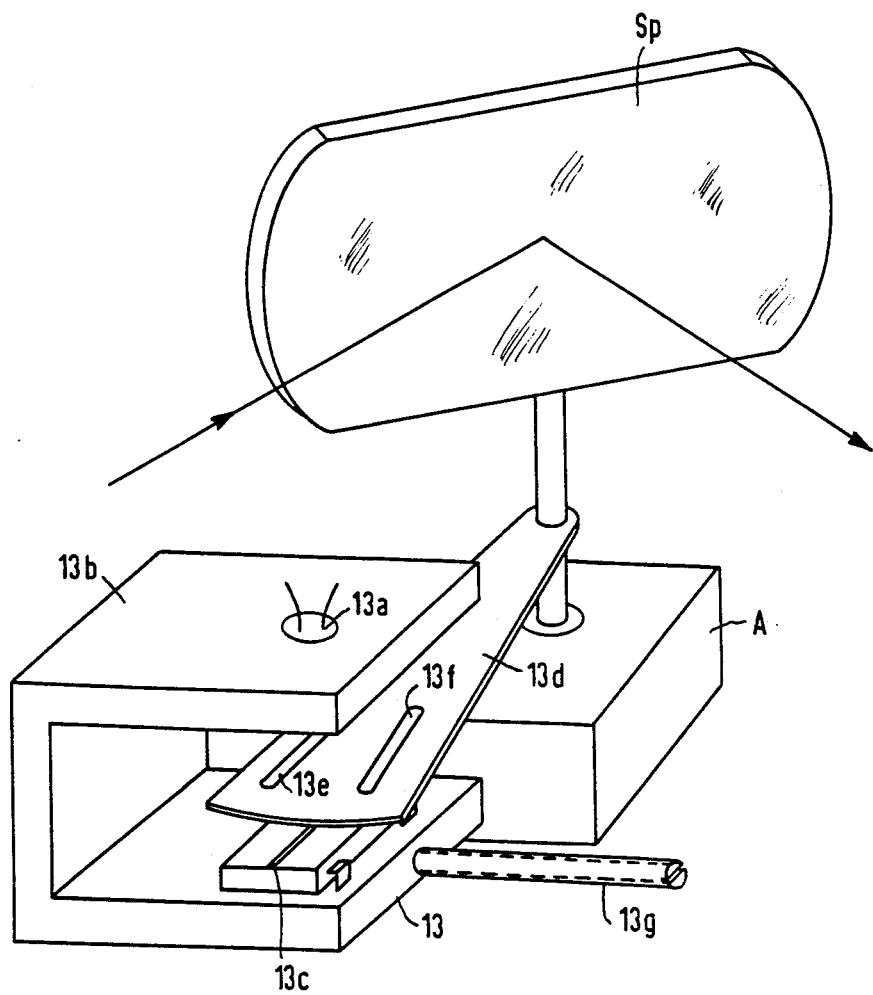
FIG. 5 is a schematic representation of a position measuring device.

FIG. 5 is a schematic representation of an illustrative embodiment of positioning measuring device 13. As noted, position measuring device 13 is intended to accurately determine the position of the deflection unit A at two adjustment points, one of which is the zero points. However, in contrast to the actual value measuring circuit M, position measuring device 13 must not be subject to thermal drift.

Position measuring device 13 contains a light emitter 13a which may, for example, be a light-emitting diode. Opposite to light-emitting diode 13a is arranged is a light receiver 13c which may, for example, a differential photodiode. Light receiver 13c is arranged on a mounting 13b. In one embodiment, light receiver 13c contains two photodiode sections, the output voltages of which are connected to buck one another. If, therefore, a light ray illuminates the separating line between the two diodes sections, these are illuminated with the same intensity, and since the output voltages of both photodiodes sections are equal, the output voltage of the entire differential photodiode is zero. If, on the other hand, the light ray deviates from the separating line, one of the two photodiode sections is subject to greater illumination, and the output voltage of the entire differential photodiode becomes either positive or negative, depending upon the direction of the deflection.

A disc 13d which is firmly coupled to a shaft of deflection unit A, is interposed in the light path between light emitter 13a and light receiver 13c. Disc 13d has two slit apertures 13e and 13f which are arranged so that each slit aperture lies at one of the two adjustment points exactly between light emitter 13a and the separating line between the two photodiode sections of differential photodiode 13c. In this manner, the output signal of position measuring device 13 becomes zero as soon as the deflection unit A has reached one of the two adjustment points.

Light receiver 13c is advantageously arranged to be positionally adjustable by means of an adjusting screw 13g. This permits the position of one of the adjustment points, preferably the zero point, to be adjusted. Such adjustability permits compensation for manufacturing tolerances for the first slit 13e, or for the attachment of disc 13d at the shaft of deflection unit A. Compensation for the manufacturing tolerances with respect to the distance between the two slit apertures 13e and 13f, which would relate to the second adjustment point, can be performed as follows: the second adjustment point is not fixed from the start, but it is first determined at which point the position measuring device delivers the voltage zero. This point would then be selected as the second adjustment reference point. The second adjustment reference point needs to be determined only once and should remain the same, if the apertures are made by machine, at least for each production lot.

Although the invention has been described in terms of specific embodiments and applications, it is to be understood that persons skilled in the art, in light of this teaching, can generate additional embodiments without departing from the spirit or exceeding the scope of the claimed invention. Accordingly, the drawings and descriptions in this disclosure are proffered to facilitate comprehension of the invention and should not be construed to limit the scope thereof.

What is claimed is:

1. An apparatus for automatically adjusting the characteristic of a deflection unit with respect to its origin and slope, the apparatus comprising:

multiplier means having a first input for receiving a reference value for the deflection unit, said multiplier means further having a second input and an output;

first memory means for storing information pertaining to a first value, said first memory means having an output connected to said second input of said multiplier means;

adder means having first and second inputs and an output for providing a signal responsive to the sum of signals at said first and second inputs, said output of said multiplier means being connected to said first input of said adder means;

second memory means for storing information pertaining to a second value, said second memory means having an output connected to said second input of said adder means;

position measuring means for producing a position measuring signal responsive to the position of the deflection unit;

first command receiving means for receiving a "zero-adjustment command;"

second command receiving means for receiving a "slope-adjustment command;"

clock means for producing signals for selectably incrementing and decrementing said first and second values in said first and second memory means;

comparator means having first and second inputs and first and second outputs for producing respective signals at said first and second outputs responsive to comparisons of signals at said first and second inputs, said position measuring means being connected to said first input of said comparator means, said second input of said comparator means receiving a signal corresponding to a zero value as a first adjustment reference value when a "zero-adjustment command" is present at said first command receiving means, and for receiving a second adjustment reference value when a "slope-adjustment command" is present at said second command receiving means, said comparator means producing at said second output said respective signal when said signal at said first input from said position measuring means is smaller than said respective signal at said second input;

means responsive to said "zero-adjustment command" for causing said first adjustment reference value having a value of zero to be provided as said reference value for the deflection unit, causing said second value in said second memory means to be incremented in response to said clock means when said respective signal is present at said first output of said comparator means, and further causing said second value in said second memory means to be decremented in response to said clock means when said respective signal is present at said second output of said comparator means until said first and second outputs of said comparator means are clear of said respective signals; and means responsive to said "slope-adjustment command" for causing said second adjustment reference value to be provided as said reference value for the deflection unit, causing said first value in said first memory means to be incremented in response to said clock means when said respective signal is present at said first output of said comparator means, and further causing said first value in said first memory means to be decremented in response to said clock means when said respective signal is present at said second output of said comparator means until said first and second outputs of said comparator means are clear of said respective signals.

2. The apparatus of claim 1 wherein said first and second memory means are loaded, prior to performing the adjustment of the characteristic of the deflection unit, with respective first and second values which are smaller than respective predetermined values which are expected after the adjustment is completed, said first and second values in said respective first and second memory means being only incremented.

3. The apparatus of claim 1 wherein there is further provided third memory means for storing said first and second adjustment reference values, said third memory means having address inputs connected to said first and second command receiving means for receiving said "zero-adjustment command" and said "slope-adjustment command," and further having an output connected to said first input of said multiplier means and said second input of said comparator means.

4. The apparatus of claim 3 wherein there is further provided double-throw switch means electrically interposed between said third memory means and said first input of said multiplier means, said double-throw switch means having a first input for receiving said reference value for the deflection unit, a second input connected to said output of said third memory means, said double-throw switch means switching from said first to said second inputs thereof in response to said "zero-adjustment command" and said "slope-adjustment command."

5. The apparatus of claim 1 wherein said first and second memory means are first and second counters, respectively, each counter having respective increment and decrement inputs, said first and second counters being selectably incremented and decremented in response to said signals from said clock means, said signals being clock pulses.

6. The apparatus of claim 5 wherein there are further provided first, second, third, and fourth AND gates, each of said gates having respective first, second, and third inputs, said first inputs of each of said gates being connected to said clock generator, said second inputs of said first and second AND gates being connected to said first command receiving means for receiving said "zero-adjustment command," said second inputs of said third and fourth AND gates being connected to said second command receiving means for receiving said "slope-adjustment command," said first output of said comparator means being connected to said third inputs of said second and fourth AND gates, said second output of said comparator means being connected to said third inputs of said first and third AND gates, said output of said first AND gate being connected to said increment input of said second counter, said output of said second AND gate being connected to said decrement input of said second counter, said output of said third AND gate being connected to said decrement input of said first counter, and said output of said fourth AND gate being connected to said decrement input of said first counter.

7. The apparatus of claim 3 wherein there is further provided computer means for controlling the automatic adjustment of the characteristic of the deflection unit, said computer means being connected to a data bus, said first, second, and third memory means being buffer memories which are correspondingly loaded with values by said computer means via said data bus.

8. The apparatus of claim 7 wherein said first, second, and third buffer memories are each provided with respective digital-to-analog converters, said third memory means and said multiplier means being combined in a multiplying digital-to-analog converter.

9. The apparatus of claim 1, 2, 3, 4, 5, 6, 7, or 8, wherein said position measuring means further comprises a plate which is mechanically connected to a shaft of the deflection unit and interposed in a light path between a light emitter and a light receiver, said light receiver delivering said position measuring signal, said plate having a first slit aperture arranged to lie in the light path when said deflection unit is in a zero position, said plate further having a second slit aperture which is arranged to lie in the light path when said deflection unit is in a position which corresponds to the second adjustment reference value.

* * * * *